United States Patent
Lejnell et al.

(10) Patent No.: US 10,855,365 B2
(45) Date of Patent: Dec. 1, 2020

(54) METHOD FOR SHIFTING COMMUNICATIONS OF A TERMINAL LOCATED ON A MOVING PLATFORM FROM A FIRST TO A SECOND SATELLITE ANTENNA BEAM

(71) Applicant: OverHorizon (Cyprus) PLC, Nicosia (CY)

(72) Inventors: Kennet Lejnell, Ekero (SE); James H. Gerow, Johnstown, PA (US); Pal Ekberg, Lund (SE)

(73) Assignee: OVERHORIZON AB, Solna (SE)

( * ) Notice: Subject to any disclaimer, the term of this patent is extended or adjusted under 35 U.S.C. 154(b) by 0 days.

(21) Appl. No.: 15/949,686

(22) Filed: Apr. 10, 2018

(65) Prior Publication Data

US 2018/0302147 A1   Oct. 18, 2018

Related U.S. Application Data

(63) Continuation of application No. 14/767,574, filed as application No. PCT/EP2014/000391 on Feb. 13, 2014, now abandoned.

(60) Provisional application No. 61/764,040, filed on Feb. 13, 2013.

(51) Int. Cl.
    *H04B 7/185*    (2006.01)
    *H04W 36/30*    (2009.01)

(52) U.S. Cl.
    CPC ..... *H04B 7/18508* (2013.01); *H04B 7/18513* (2013.01); *H04B 7/18515* (2013.01); *H04B 7/18541* (2013.01); *H04W 36/30* (2013.01)

(58) Field of Classification Search
    CPC ............ H04B 7/18508; H04B 7/18513; H04B 7/18515; H04B 7/18541; H04W 36/30
    See application file for complete search history.

(56) References Cited

U.S. PATENT DOCUMENTS

| | | | |
|---|---|---|---|
| 4,345,256 A | 8/1982 | Rainwater | |
| 5,398,035 A | 3/1995 | Densmore et al. | |
| 5,517,205 A * | 5/1996 | van Heyningen | H01Q 1/18 248/183.1 |

(Continued)

FOREIGN PATENT DOCUMENTS

| | | |
|---|---|---|
| EP | 1764933 | 3/2007 |
| JP | 62-084604 | 4/1987 |

(Continued)

OTHER PUBLICATIONS

Combined International Search Report and Written Opinion for PCT/EP2014/000391, dated Apr. 23, 2014 (10 pages).

(Continued)

*Primary Examiner* — Andrew Lai
*Assistant Examiner* — Harry H Kim
(74) *Attorney, Agent, or Firm* — White & Case LLP

(57) ABSTRACT

A method for shifting communications of a terminal located on a moving platform from a first satellite beam to a second satellite beam comprises determining a time for initiation of a beam shift from the first satellite beam to the second satellite beam; executing a first beam shift from the first satellite beam to the second satellite beam; and executing a second beam shift from the first satellite beam to the second satellite beam, wherein the first and second beam shifts are performed using a switch matrix.

16 Claims, 6 Drawing Sheets

(56) References Cited

U.S. PATENT DOCUMENTS

| | | | |
|---|---|---|---|
| 6,538,612 B1 | 3/2003 | King | |
| 6,653,981 B2 | 11/2003 | Wang et al. | |
| 7,173,571 B2 | 2/2007 | Webb et al. | |
| 7,542,716 B2* | 6/2009 | Bell | H04B 7/18515 455/3.02 |
| 7,705,793 B2 | 4/2010 | Kaplan et al. | |
| 8,248,318 B2 | 8/2012 | Wahlberg et al. | |
| 8,786,506 B2* | 7/2014 | Ayotte | H01Q 1/1235 343/766 |
| 2002/0093451 A1* | 7/2002 | Harmon | H04B 7/18519 342/354 |
| 2005/0259021 A1 | 11/2005 | Stoyanov et al. | |
| 2007/0001920 A1 | 1/2007 | Webb et al. | |
| 2007/0135040 A1 | 6/2007 | Draim | |
| 2008/0018545 A1 | 1/2008 | Kaplan et al. | |
| 2011/0076956 A1* | 3/2011 | Tronc | H04B 7/18515 455/66.1 |
| 2011/0105126 A1 | 5/2011 | Liang et al. | |
| 2011/0317665 A1* | 12/2011 | Jung | H04W 24/02 370/331 |
| 2014/0045420 A1* | 2/2014 | Tong | H04B 7/18506 455/12.1 |
| 2016/0126625 A1* | 5/2016 | Gurewitz | H04B 7/18517 342/353 |
| 2017/0047653 A1 | 2/2017 | Runyon et al. | |
| 2017/0085314 A1* | 3/2017 | Davis | G01S 19/02 |
| 2018/0248676 A1* | 8/2018 | Raggio | H04B 7/15542 |
| 2019/0326982 A1* | 10/2019 | Darby, III | H04B 7/195 |

FOREIGN PATENT DOCUMENTS

| | | |
|---|---|---|
| JP | 09-153718 | 6/1997 |
| JP | 10-178313 | 6/1998 |
| JP | 2001-0077637 A | 3/2001 |
| WO | WO2004073229 | 8/2004 |
| WO | WO-2007064094 A1 | 6/2007 |
| WO | WO-2007067016 A1 | 6/2007 |

OTHER PUBLICATIONS

International Preliminary Report on Patentability and Written Opinion issued in International Application No. PCT/US2006/049417 dated Jul. 1, 2008 (6 pages).

International Preliminary Report on Patentability and Written Opinion issued in International Patent Application No. PCT/EP2008/007548 dated Mar. 16, 2010 (11 pages).

Combined International Search Report and Written Opinion for PCT/EP2019/066420, dated Sep. 19, 2019 (170 pages).

* cited by examiner

METHOD FOR SHIFTING COMMUNICATIONS OF A TERMINAL LOCATED ON A MOVING PLATFORM FROM A FIRST TO A SECOND SATELLITE ANTENNA BEAM

CROSS-REFERENCE TO RELATED APPLICATIONS

This application is a continuation of U.S. application Ser. No. 14/767,574, filed on Aug. 12, 2015 (now abandoned), which is a U.S. National Stage filing under 35 U.S. C. § 371 of International Application No. PCT/EP2014/000391, filed on Feb. 13, 2014, which claims the priority benefit of U.S. provisional application Ser. No. 61/764,040, filed on Feb. 13, 2013. Each of the foregoing applications is incorporated herein by reference in its entirety.

BACKGROUND OF THE INVENTION

Many airlines offer passengers the ability to engage in wireless communications in flight, such as using a personal laptop or tablet computer to access websites or E-mail services. These wireless communications can take place over wife and over a satellite link to a terrestrial gateway antenna.

When communicating using a terminal located on a moving platform (such as an aircraft) covering large distances, the use of conventional satellites having wide beam coverage can provide for continuous connection for an extended period of time. When switching from one satellite to another, or for multi-beam satellites, from one satellite beam to another, the connection can be lost, and this down time is typically of the order of minutes. Although continuous continental and intercontinental communications with wide-beam satellites can take place with a limited number of satellite changes, a drawback of wide beams is that they provide low power density and low sensitivity since the energy is spread/received from a wide area, making it impossible to support high data rates on the moving platform using small antennas.

A multi-spot beam satellite generally has a high power density and high sensitivity with a wide coverage region, but the wide coverage is defined by a large number of different beams. Neighboring beams must use different network conditions such as frequencies and/or polarization in order to reduce inter-beam interference, and the individual beams will have a small spot beam size. The small spot beam size will cause a frequent need to move from one beam to another, and it is no longer acceptable to lose communication during such shifts.

Although some of the beam shifts can be pre-planned before the trip, such pre-planning can be very difficult since flight delays, changes of itinerary, and weather can affect the planned trip route. If the moving terminal travels into beams that were not pre-planned, rapid coordination with the satellite operator is needed to ensure continuous communications. Since the satellite operator does not know at all times which frequencies may be available in each beam, pre-planning is therefore complex and very inefficient. The satellite operator does not want to reserve frequencies in particular beams unless these frequencies are paid for, thereby removing them from general usage and causing inefficient use of spectrum, as well as significantly increasing service costs. If route planning takes place long before the actual trip, pre-planning which satellite frequencies to use becomes even more difficult, and communications become even more expensive since longer lead times may result in even further changes, both environmentally and on the satellite.

The technical characteristics of a satellite connection when moving from one beam to another will now be described with reference to FIG. 1. FIG. 1 illustrates a mobile user located in an aircraft communicating over a satellite to a terrestrial gateway (GW) antenna, and the mobile user will be leaving one coverage area (Beam 1, covering North America) and entering another coverage area (Beam 2, covering Europe).

When switching from Beam 1 to Beam 2, the user will first typically lose a connection to Beam 1, and then have to re-establish a connection to Beam 2. This reconnection can be a rather complicated process, and the communication line will be down until the connection to the second beam can be established. In a multi-beam environment where the beam diameter on the ground is small, this reconnection problem grows since the mobile platform will need to shift beams quite often, especially when moving quickly such as in flight. When the mobile platform enters the beam overlap region where a beam switch will have to be managed, the actual time it takes to move from a good connection to a lost connection is small.

One important parameter for multi-beam systems is inter-beam isolation, and in order to get high isolation, it is necessary to define the edge of coverage further down on the lobe as compared to the theoretical optimum edge of coverage gain. This phenomenon is illustrated in FIG. 2, which shows an exemplary antenna pattern for a parabolic reflector antenna. The multi-spot beam edge is defined at 7 dB below the beam peak (upper horizontal line). The 1 dB higher gain contour, relative to the edge of coverage gain, is indicated by the lower horizontal line and the angular distance on the edge is 0.05°, which at nadir is approximately 19 miles (31 km). The time it takes for an aircraft traveling at a speed of 530 mph (850 km/h) to traverse this distance is slightly more than 2 minutes, and hence, timely beam switching is needed.

For a multi-spot coverage beam where the edge of coverage is defined at 0.5° (approximately the size of the spots in the Eutelsat Ka-Sat system), the region where the gain drops by 1 dB is only 7 miles (11 km) and the corresponding time for an airplane to travel this distance is approximately 46 seconds.

Accordingly, there is an unmet need for rapid automated switching of satellite beams by terminals located in moving platforms while maintaining continuous communications.

BRIEF DESCRIPTION OF THE INVENTION

The present invention is intended to address the above problems associated with satellite communications. One aspect of the present invention is directed to a method for shifting communications of a terminal located on a moving platform from a first satellite beam to a second satellite beam. The method comprises determining a time for initiation of a beam shift from the first satellite beam to the second satellite beam; executing a first beam shift from the first satellite beam to the second satellite beam; and executing a second beam shift from the first satellite beam to the second satellite beam, wherein the first and second beam shifts are performed using a switch matrix.

The invention is equally capable of handling beam shifts in any order. For example, the first beam shift may be an uplink beam shift and the second beam shift may be a downlink beam shift. Alternatively, the first beam shift may be a downlink beam shift and the second beam shift may be an uplink beam shift.

The invention can determine the connection quality of a prospective beam switch prior to completing the beam switch. That is, the invention examines the quality of the connection to the second satellite beam prior to a beam switch. If the connection quality is high, (for example, if there is little chance of a dropped connection upon switching to the second beam), the invention will undergo the beam switch. If the quality of the connection to the second beam is below a predetermined threshold, for example, due to noise, the invention will not undergo the beam switch and will revert back to the first satellite beam. In this manner, the invention seeks to maintain a high quality connection to minimize outages or gaps in coverage.

The first and second beams may be broadcast by the same satellite or by two separate satellites.

Another aspect of the present invention is directed to a system for automated shifting of a communications signal of a terminal located on a moving platform from a first satellite beam to a second satellite beam. The system may comprise components such as an uplink switch for receipt of the communications signal; a downlink switch for transmission of communications; and computer instructions for determining optimal time for beam shift execution.

The uplink switch may comprise elements such as a regenerative payload comprising at least one demodulator for extracting information received in the satellites, and an on-board processor for processing data; and a switch matrix and/or a channelizer for switching an uplink data channel from the first satellite beam to the second satellite beam.

The downlink switch may comprise elements such as a regenerative payload comprising at least one demodulator for encoding a data signal to be sent to the satellites, and an on-board processor (OBP) for processing data; a switch matrix and/or a channelizer for switching a downlink data channel from the first channel to the second channel; and at least two demodulators with a corresponding switch functionality in the terminal.

The switch matrix and/or channelizer of the uplink switch may be configured to switch the uplink data channel from the first beam to the second beam into a common regenerative payload demodulator circuit in a synchronized manner concurrently with a corresponding frequency switch in the terminal uplink.

The downlink switch can be configured to comprise two demodulators, wherein the first demodulator is locked on a downlink signal from the first beam and the second demodulator is locked on a downlink signal from the second beam.

A user application on the terminal can be connected to either the first or second demodulator, whichever is active with respect to connecting the application traffic flow, through a command controllable switch, a non-manual switch connected to the controller software which controls the hardware of the switch. Such an embodiment allows for ready control of the beam switching process.

Each satellite can be equipped with a software engine and control function connected to respective on-board processors and switch matrixes and/or channelizers. Similarly, the terminal can be equipped with a terminal software engine and control function, and the respective software engines and control functions of the system can be synchronized with each other and configured to generate and transmit the switch command to execute the shifting of the communications signal. Such embodiments allow for efficient synchronization of a beam shift.

In one embodiment, the system can generate the switch command on-board the satellite and send the switch command to the terminal for execution. The system can also generate the switch command in the terminal and transmit the switch command to one or more satellites for execution. The switch command can be configured to contain specific information for synchronizing or timing a beam shift, and this timing is provided to the components of the system for preparation for the beam shift.

The terminal can be configured to request a beam shift based on its location and local conditions. That is, if the terminal expects that the current beam signal will weaken for whatever reason, such as poor weather or other atmospheric conditions, the terminal can request a beam shift to a stronger signal.

The system can also be configured to respond to input from sensors on the ground and from information received from the OBP and/or a network operations center for improvement of satellite coverage. For example, the system can be configured to increase signal capacity by switching in additional power, moving additional beams into a desired service area, or adding frequency slots in certain regions. The system recognizes this newly-added signal capacity and executes automated satellite beam shifting as necessary in response to such newly-added signal capacity.

The system can also be configured to gather information from various sources, such as from communications traffic flowing through a network comprising the system, from an onboard processor and a network operations center, and/or from sensors such as ground sensors or atmospheric sensors about issues affecting signal conditions, and to inform users in real time thereof. That is, the system in the satellite may gather information from various sensors located at any place on the ground or in the atmosphere to acquire data about problems affecting link conditions, such as weather and other local effects, and can inform mobile users in the system, with effectively no delay, about such local problems. Users can then take whatever action may be advisable, such as changing their route, and thereby avoiding loss of communication caused by any potential problems.

The system can also be configured so as to provide flight control executed from the satellite which optimizes communications capacity at all times. That is, the system can comprise computer instructions and flight control configured to maintain optimized communications signal capacity and quality during travel of the moving platform. In this regard, the system is operationally linked to the flight control system so that the moving platform remains in a flight path which provides optimal signal quality.

Other aspects and advantages of the invention will be apparent from the description below.

BRIEF DESCRIPTION OF THE FIGURES

FIG. 2 shows that the window going from good signal to drop-off is short, and that there is the need for a system that can automatically takes care of the beam shift maneuver.

DETAILED DESCRIPTION OF THE INVENTION

Although the following discussion refers to a mobile terminal located on an aircraft to exemplify the invention, the principles of the invention are equally applicable for any moving platform. The invention is applicable to any mobile platform moving at a speed which makes it likely to cross between different beams over a period of days, hours, or shorter increments of time.

The present invention addresses problems currently associated with switching from a first satellite beam to a second satellite beam. The current state of the art requires a complicated manual procedure involving both the user and personnel at the gateway/NOC during a beam switch. If the switch is unsuccessful, the signal is dropped entirely, thereby leaving the mobile platform without communication capabilities for a certain period of time. As discussed above, the region going from a fair signal environment down to drop-out conditions can be small and hence the corresponding time window for a beam switch is short, and will depend on the spot beam size, which is typically on the order of a few minutes or less for an aircraft. A shift beam may be needed quite frequently when the platforms move through a multi-spot grid. Accordingly, multi-spot beams do not provide particular advantages during high speed travel.

To address these and other problems associated with the prior art, the present invention provides a system that automatically detects and switches to new beam parameters when going from one beam to another, both on the uplink and downlink side, in a coordinated fashion and without dropping the communication link. The system monitors the need for a beam shift, and when the system determines that a beam shift will be necessary, it will initiate the beam shift process. The present invention will typically be installed at the factory during manufacture of the satellite.

Figure 1:
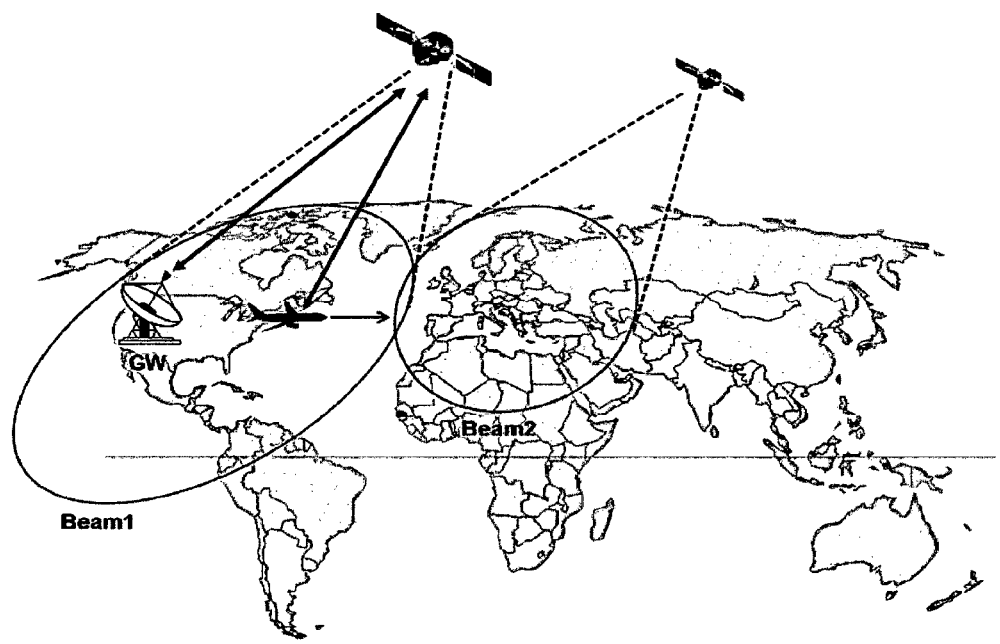
FIG. 1 illustrates an aircraft flying over the Atlantic region. The satellite is in communications with a first satellite network (Beam 1), and the aircraft satellite communication system must switch to another satellite network (Beam 2), to maintain continuous communications. The beam switch must take place in the beam intersection region.
Figure 2:
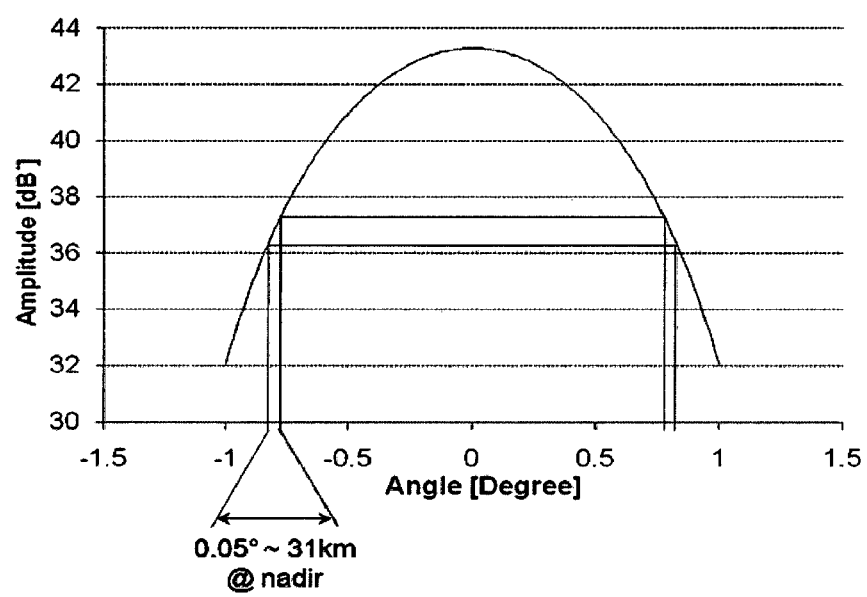
FIG. 2 shows a typical antenna pattern for a parabolic reflector system.
Figure 3:
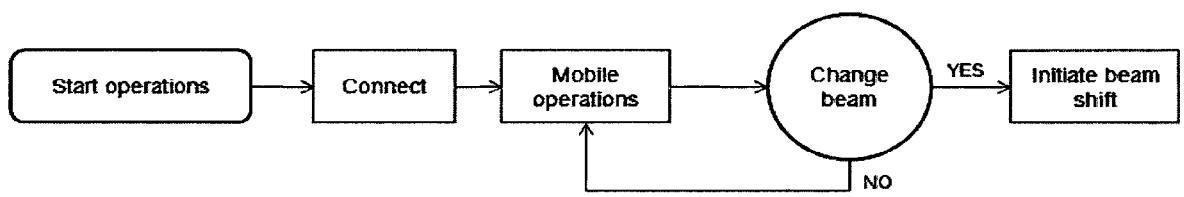
FIG. 3 is a schematic flow diagram illustrating continuous monitoring of the need for a beam shift according to an aspect of the invention. When this need to switch beams arrives, the system according to the present invention will initiate a beam shift procedure.
Figure 4:
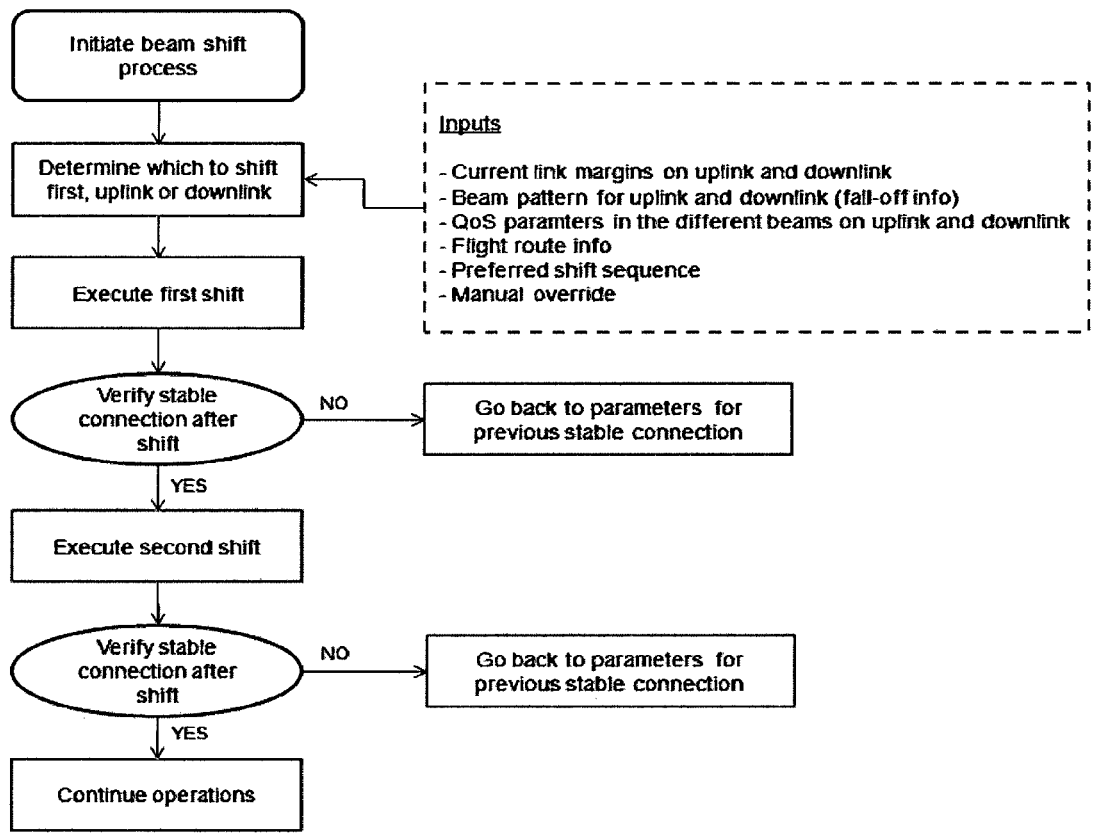
FIG. 4 is a schematic flow diagram illustrating an exemplary process according to the present invention for determining whether to shift the uplink or downlink first, and the sequence of events that needs to take place.

To solve the problem of maintaining continuous communication to and from a moving platform when moving from beam to beam, the present invention provides for a satellite switching system having an input section comprising a switch matrix and/or a channelizer, and a regenerative payload including an on-board processor (OBP) and associated software engine. In the regenerative payload and OBP, the signals are received and demodulated such that the transmitted bit stream are uncovered for extraction of useful information and commands for timely action on-board the satellite. The on-board equipment also provides information about the link quality, such as signal to noise measures, e.g. C/No or Eb/No. A flow chart showing the beam shift process on uplink and downlink is illustrated in FIG. 4.

A switch is a simple implementation of a channelizer in that a switch takes the complete input of a transponder and switches that data stream into a particular output transponder. In contrast, a channelizer operates on a level between the input and output transponders, and can take a portion of the input section of the transponder and direct it to any of the output transponders, thereby providing greater flexibility as compared to a switch. A switch can be used instead of a channelizer when the manufacturer designs complex satellites with small bandwidth transponders, whereas wide bandwidth transponders will typically be coupled to a channelizer.

When the beam shift process has been initiated, the procedure for shifting on the uplink and the downlink is coordinated by the system. The system first determines which link (uplink or downlink) to shift. For example, if the link margin on the uplink is smaller than the link margin on the downlink, it is likely that the uplink will be lost first when the moving platform moves out of the beam, and hence it would be preferable to switch the uplink first. In other situations, the quality of service parameters of the different beams or changes to the flight route, might differ on the uplink and downlink sides, and these factors can be considered when determining the beam shift sequence. In certain instances, the decision to switch beams can be made by a user upon review of the beam or connection quality.

If the beam shift is not successful, the system can shift back to the previous parameters to reestablish the link to the first beam to maintain continuous communications. The system will then attempt to shift beams again, optionally after a short pause (seconds or milliseconds) to clear out any buffers. Since both uplinks and downlinks are not shifted at the same time, the invention ensures that one of the uplink or the downlink will always be connected even when a beam shift is not successful. This feature of the invention enables the system to reestablish a lost uplink or downlink connection.

Figure 5:
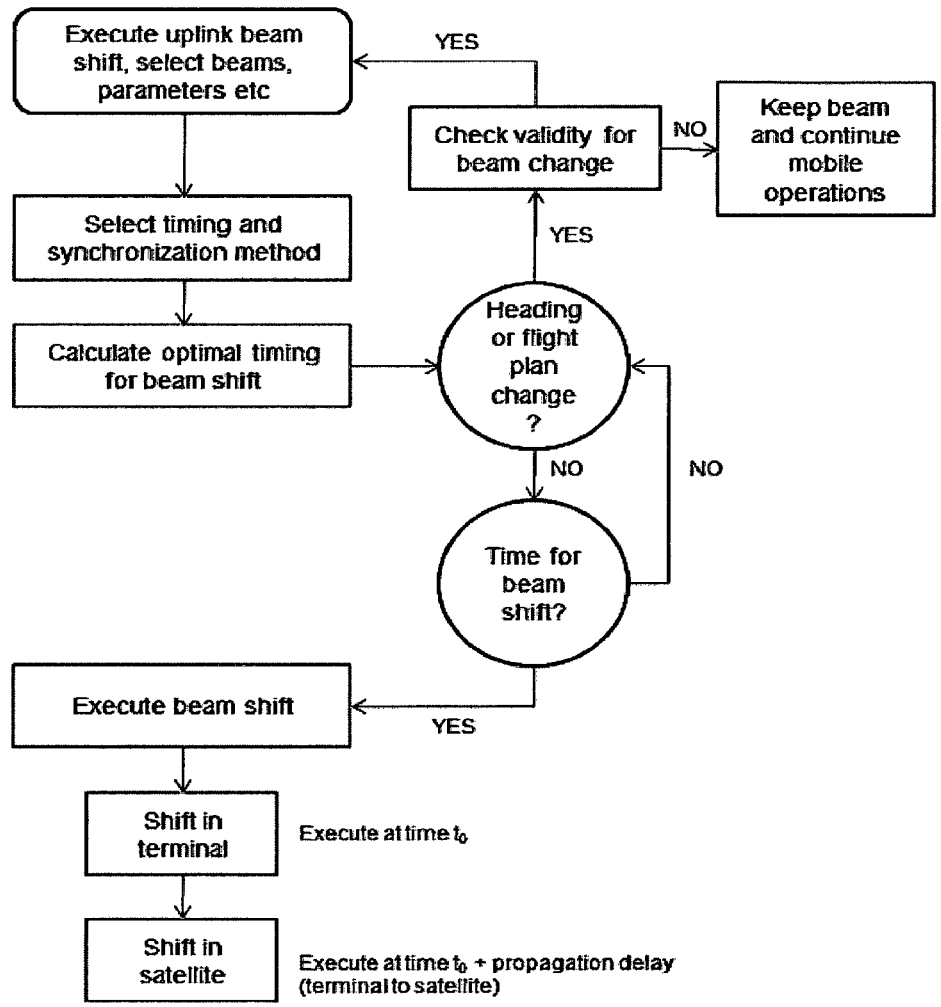
FIG. 5 is a schematic flow diagram illustrating beam shift execution on the uplink, and shows the timing of the beam shift and the potential for changes in the need for a beam shift.

A change of frequency in the terminal located on the moving platform needs to be synchronized with the switch in the channelizer on the satellite. Looking first at the uplink, when the terminal executes a shift in transmission frequency from frequency $f_0$ to frequency $f_1$, the signal travels from the terminal up to the satellite which is approximately 36,000 km from Nadir in approximately t=(distance to satellite)/(speed of light)=36000/300000=about 120 ms (milliseconds). When the switch signal is received in the satellite, the channelizer in the satellite will then make the corresponding switch. This sequence for the uplink is illustrated in FIG. 5. If the heading or the flight plan has changed in such a way that the projected need for a beam shift is no longer valid, the beam shift process is interrupted and the system maintains its current conditions. In this embodiment, the communication parameters are shifted first in the terminal or moving platform at $t=t_0$ and after this shift has propagated up to the satellite, the shift is then executed in the satellite. The system at the terminal can be configured to continuously sense the presence of other beams for potential shifts, or the system can be configured to turn itself on when the system expects that the moving platform will be near an overlap region for an upcoming beam switch.

Figure 6:
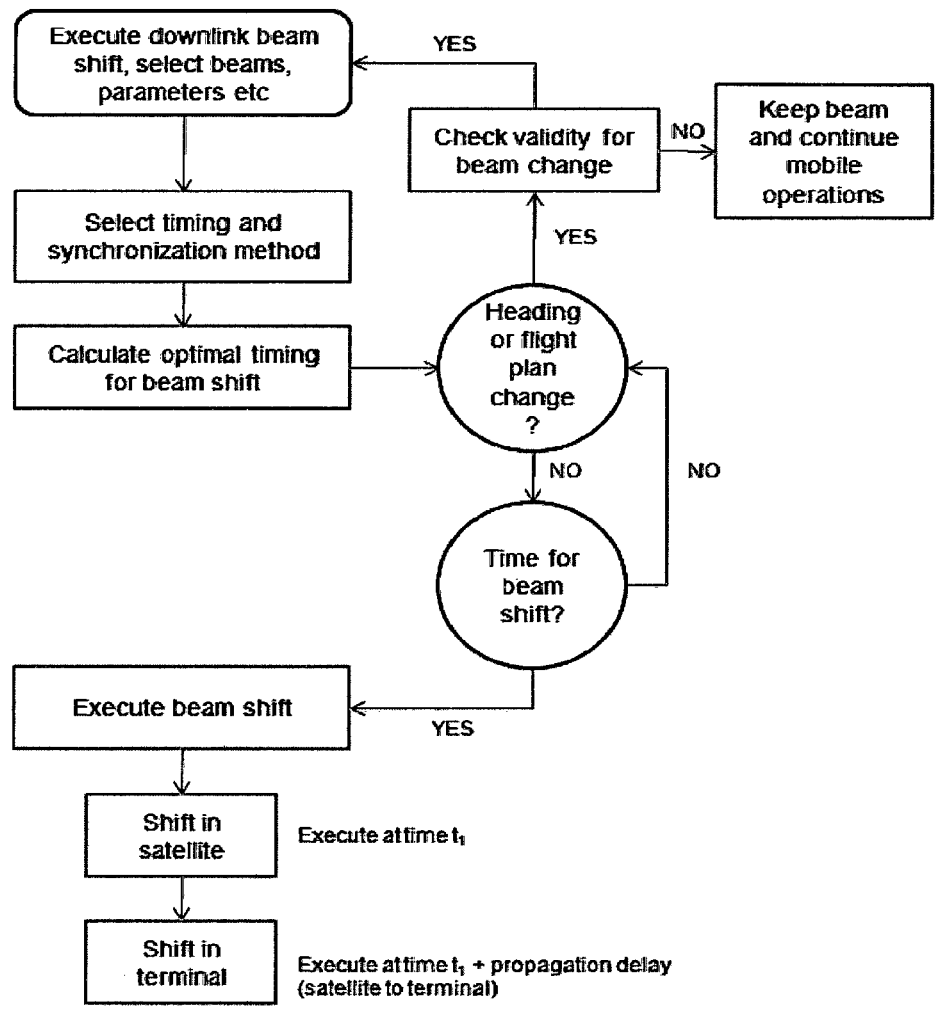
FIG. 6 is a schematic flow diagram illustrating beam shift execution on the downlink.

The corresponding but reversed execution sequence is illustrated for the downlink in FIG. 6. This process is very similar to the shift performed on the uplink (FIG. 5) but differs in the sequence of shift commands. In FIG. 6, the shift is first executed in the satellite, and after this shift has propagated down to the terminal located in the moving platform, the shift is then executed in the terminal. The implementation of the switching will depend on the particular implementation of the invention and upon the intended applications.

Figure 7A:
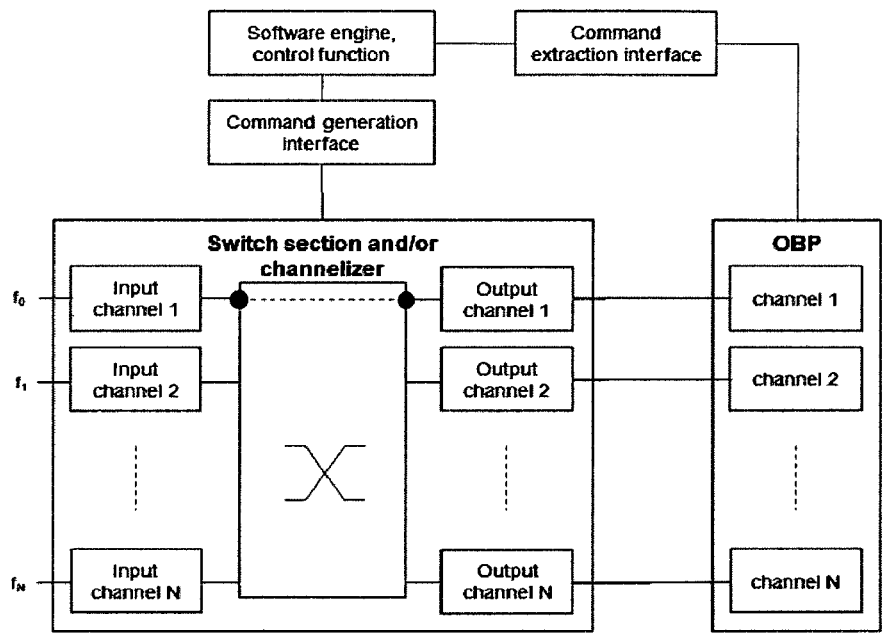
FIG. 7a is a schematic diagram illustrating an exemplary hardware implementation according to an embodiment of the invention.

To enable the switch on the uplink side, the satellite input section has a switch matrix and/or a channelizer to switch the uplink signal from the terminal into a specific OBP channel on the satellite, even when the uplink frequency changes as a result of the user moving from one beam to another. FIG. 7a illustrates a switch section and/or channelizer, on-board processor (OBP), and the associated control software and interfaces. In FIG. 7a, the switch section is set such that the frequency $f_0$ which is received in the satellite is connected to input channel 1, and this data goes through the switch and/or channelizer section and is output on output channel 1 which is connected to channel 1 of the on-board processor.

Figure 7B:
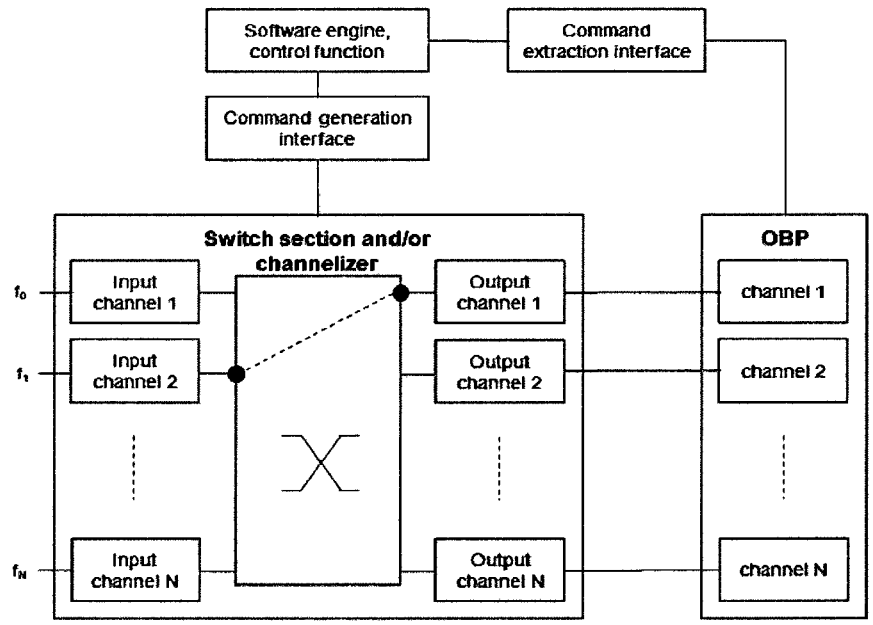
FIG. 7b is a schematic diagram showing the embodiment of FIG. 7a after the beam switch has taken place.

In FIG. 7b, the communication link has shifted from frequency $f_0$ of Beam 1 to frequency $f_1$ of Beam 2. The dotted line illustrates that, the signal passing through the switch section is adjusted such that communications from input channel 2 now passes to output channel 1 which remains constantly connected to OBP channel 1. Hence, from the OBP perspective, the communication link looks exactly the same as before the beam switch since the signal received by the OBP channel 1.

As illustrated in FIGS. 7a and 7b, when shifting from Beam 1 at frequency $f_0$ to Beam 2 at frequency $f_1$ (optionally involving polarization), the signal maintains a constant connection to the same OBP channel (channel 1 in this example). A corresponding switch functionality is implemented in the terminal on the downlink side.

Figure 8:
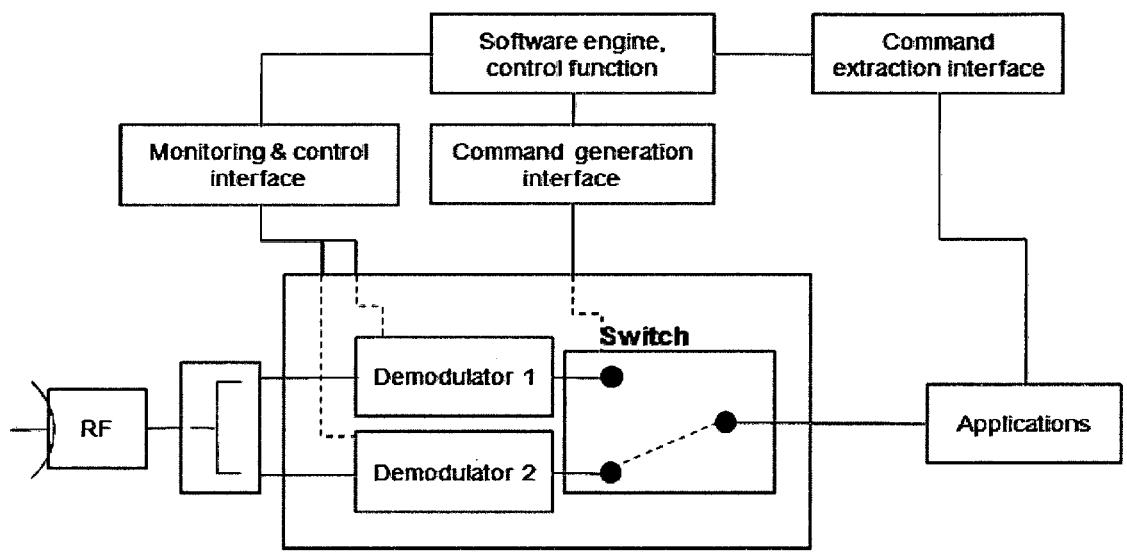
FIG. 8 illustrates terminal receive blocks according to an embodiment of the invention.

In one embodiment, two demodulators and a channelizer/beam switch after the demodulators can be used to keep the active signal switched into the application. This switching is illustrated in FIG. 8, which illustrates an embodiment showing principal components of the terminal and the downlink related blocks. The terminal receive blocks comprise of a double set of demodulators, a controllable switch, control blocks, and a control loop. The control intelligence modules are connected to the demodulators to enable setting the correct communications parameters when the moving platform enters into new beams and for monitoring received signal quality. Corresponding terminal functionality would be implemented on the uplink side.

Similar switching means can be employed for both uplink and downlink communications, although in certain embodiments, the uplink and downlink systems may have different structural configurations and components. Similarly, consistent with the invention, the switching hardware located in the terminal and in the satellite may be similar or may have a different structure.

The components of the present invention, such as the switch section, channelizer, and on-board processor can be conventional, although the system will generally be custom-configured for each particular implementation. Examples of commercial vendors selling components for use in the present invention include Advantech Wireless (Suwanee, Ga.) for modulators on-ground; STM Group (Irvine, Calif.) for SatLink hubs and VSAT modems; VT iDirect, Inc. (Herndon, Va.) for satellite routers; Thales USA (Arlington, Va.), Orbital Sciences (Dulles, Va.), Loral Space & Communications (New York, N.Y.), Boeing (Berkeley, Mo.), and Astrium North America (Houston, Tex.) for switch sections; Thales Alenia Space North America (Cupertino, Calif.), Thales Alenia Space Spain (Tres Cantos, Madrid, Spain), MDA Information Systems (Richmond, British Columbia, Canada), and Astrium for on-board processors; and Boeing and Astrium for digital channelizers.

Examples of terminals which are suitable for use in the present invention include conventional antennas which communicate to a satellite, as well as those which are designed for use on-the-move.

In addition to the hardware components discussed, the invention will also comprise the requisite computer instructions to allow the system to perform the present invention. These computer instructions can be implemented as in the form of software code stored in volatile or non-volatile computer memory. Alternatively, the computer instructions can be written to hardware, in the form of a custom-designed and installed integrated-circuit (IC) chip, such as an ASIC circuit, which comprises embedded hardware instructions for performing the invention, or the instructions can be written to a reprogrammable IC device which allows for updating of the embedded computer code instructions with new instructions.

The hardware components of the invention such as the switch section and demodulators will generally be located on the moving platform, whereas the space-based switch section, channelizer, on-board processor, and the associated interfaces will generally be located in the satellite. However, in certain embodiments of the invention, the components may be located on either the moving platform or on the satellite. Both the moving platform and the satellite have a software engine on-board to perform the invention.

The timing of beam switches can be achieved by different methods as detailed below. For example, the invention may communicate with other satellite systems to form a relay network encircling the globe, or communications signals can be passed off to other terrestrial gateways in order to reduce the distance that a signal may have to travel.

Uplink System for Continuous Connection

Using inputs such as signal quality, altitude, speed and direction data received from the moving platform, the present invention can calculate when a beam switch will be necessary and can generate a switch command. In one embodiment of the invention, this switch command can be generated on-board the satellite and sent down to the terminal located on the moving platform. The terminal then executes the switch when the command is received or after a pre-defined delay. The corresponding beam switch in the satellite is executed, taking into account factors such as the time it takes for the signal to go from the satellite to the terminal, the time it takes for the command to be executed in the terminal (including any pre-defined delay), and the time it takes for the signal to go from the terminal up to the satellite.

An uplink beam switch can be achieved by an on-board software program which connects with the channelizer/switch and the on-board processor. Accordingly, a processor hosting the software and an interface between the channelizer/switch and on-board processor are required. For the downlink, a modified version of the software used for the uplink can be employed. As the downlink beam is typically in communications with a terrestrial terminal, and not an orbiting satellite, the downlink hardware and software will normally be customized for terrestrial communications in order to maximize the performance of the communications link.

In another embodiment of the invention, the switch command can be generated in the terminal and sent up to the satellite provided that an open frequency in the second beam is available for the switch. The switch command can include information for the correct timing of the switch. For example, the switch command may contain an instruction that the shift from $f_0$ to $f_1$ is to be executed immediately upon receipt. This provision requires that the time slot between signal frames be long enough to allow for extraction and execution of the switch command before the next frame arrives. Otherwise, additional delays may be necessary to ensure that the switch command can take place at the intended time.

In another embodiment of this invention, when the beam borders are well-defined, the system can use knowledge in the satellite about the speed, direction and altitude of the moving platform to enable the software engine on-board the satellite to compute the time when the platform will cross the border to the next beam, and hence time the switching accordingly.

It is also possible to allow the terminal to request a beam shift, based on the local conditions where the terminal is located, and on the system's prior knowledge of the flight plan. Factors to include when evaluating the timing for the beam switch may include information related to the quality of service in the current beam, prior knowledge about a quick maneuver shift that is not predicted by linear extrapolation, or a pre-defined route only known locally. If there is communication space free in the requested beam, then the terminal will be free to shift to the second beam. The beam shift is acknowledged by the on-board system, optionally in connection with a ground-based Network Operations Center (NOC). The shift can be initiated by a shift command sent from the terminal in one frame containing instructions that a shift will take place X frames after the current frame. The system would send X frames with current communication parameters, and after counting X received frames, at frame X+1, the beam will shift to the new beam and resume continuous communications without a break.

Downlink System for Continuous Connection

To allow for the terminal to stay connected during flight, it is necessary for the system to make both uplink and downlink beam switches. An embodiment of a terminal receive (downlink) system will now be discussed.

As mentioned above, an embodiment of a downlink system, illustrated in FIG. 8, comprises two separate demodulator circuits. With two demodulation circuits, it is possible to have one circuit in active satellite communications and other circuit available for switchover. When entering the overlap space between the beams, both demodulator circuits will be able to lock on to the signals from the different beams: the first demodulator stays locked on to the original beam, and the second demodulator locks on the signal from the new beam to which the switch shall be executed. When the signal quality in the second beam is acceptable, the beam switch is executed along the same principles as for the uplink switch.

Another embodiment of a downlink system comprises a single demodulator. In this case, the system will rely on intelligence in the software to predict when the switch should take place, and the execution will be similar to the execution on the uplink. If there is only a single demodulator, the uplink switch will be executed either before or after and not at the same time as the downlink switch. The separate switch timings will ensure that the system maintains a connection to at least one satellite at all times.

In another embodiment of the invention, the downlink system may comprise three or more demodulators. The third (and any subsequent) demodulator can operate, for example, over a separate communication and control channel having more robust signaling properties. Such embodiments advantageously allow larger link margins, thereby permitting the satellite to maintain link connections, for example, over a non-spot beam if such is present on the satellite. In such an embodiment, the link connection to the third demodulator may be of a TDM (time division multiplexing) type such that it uses a minimum of bandwidth and can be shared by many users. The first and second demodulators can be used for more demanding links with minimum link margins in the high density spot beams.

Due to the frequency re-use scheme in the spot beam allocation, it is often necessary to have different frequencies in neighboring beams. In such instances, it is generally not feasible to use a channelizer in the satellite to compensate for the parameter switch when going from one beam to another on the downlink. Accordingly, the dual demodulator function shown in FIG. 8 can be included in the terminal on ground, and the switch function performed in this on-ground terminal, similarly to the switch that is being done on the uplink side in the satellite with the switch/channelizer. The dual demodulator can be two separate demodulators, or it can be a single hardware element which contains or emulates a plurality of demodulators, such as a multiple core processor.

The transmit function in the satellite utilizes the modulator which encodes the signal going down and the switch from one downlink frequency to the next when the beam shift is executed. This switch in the downlink frequency can be adjusted for in the ground terminal by switching from one demodulator to the other in a similar fashion as the switch is performed on the uplink side in the satellite.

In another embodiment of the invention, the downlink can be configured with larger link margins relative to the uplink, thereby enabling the downlink to stay connected further into the overlap region. In such an instance, the uplink switch can be executed first, followed by the downlink switch.

General System Intelligence and Applications of the Invention

Implementation of the invention as described advantageously eliminates the time-consuming process of re-acquiring a lost connection. When a respective uplink or downlink signal has entered the OBP, the signal will be switched or routed to the uplink or downlink, as required, and the user will not experience any downtime. The system may be expanded to include additional system intelligence to improve the overall quality of service, and may also include special service offerings based on executable codes uploaded to the software engine on-board the satellite. The quality of service may be improved based on information about the users of the system (such as but not limited to type of connection/device, mobility data, and technical specifications), local weather, and other local conditions which may be determined in the satellite based on sensors located on the ground and information received from the NOC.

The invention also allows for the use of information that is gathered in the satellite from sensors and other gauges such as traffic patterns, news, and political information to execute other commands and processes. For example, if a news event on the ground causes increased numbers of users in the aircraft wishing to establish voice or data communications to learn about this new event and consequently increasing the possibility of signal congestion, satellite coverage can cope with this increased demand by responding with switching in more power or additional frequency slots in a certain region.

The invention also allows for data analysis on-board the satellite to generate commands for different applications. For example, the data analysis can be a trading platform uploaded on-board the satellite which is receiving input from a plurality of different locations, each trading in real time. By processing this data, the system can generate commands such as buy/sell orders that are sent down to the ground.

If the mobile platform is travelling according to a pre-defined route, a beam shift plan can be pre-loaded into the inventive system and the beam shift timings pre-programmed in accordance with the methods previously described.

The invention also allows for sharing of information from the on-board system on the satellite to the terminal on the moving platform in regards to the quality of service of the different beams in the system. For example, if certain well-characterized regions are prone to have high signal congestion, these beams can be avoided if the planned travel or flight route of the moving platform is slightly changed. Alternatively, if the beam pattern can be adjusted, additional beams can be moved to the region, more power can be focused into the congested beams, or additional frequencies can be switched into these beams.

When more than one mobile unit is travelling at the same time, it is possible for the system to calculate optimal quality of service and communication slot sharing properties for the different mobile units before they enter new beams. This calculation can be based on each terminal's type of service. For example, a premium service terminal can be allowed communication space before a lower priority terminal.

If several terminals are moving towards the same beam, the present invention can determine preferred communication parameters and beam switch times. Factors that may be considered include time of arrival at the beam switch location and quality of service parameters for each terminal. If there is a risk of congestion, a warning can be sent to the lowest priority or quality of service terminals before additional terminals enter the congested beam. Such congestion data can be used to pre-plan a beam switch and make changes to the anticipated flight route if necessary.

Knowledge of problems such as bad weather in certain areas makes it possible to change a flight plan to avoid a potential loss of communications by a new choice of route. In such instances, the system may allocate additional capacity to those areas which can accommodate additional units.

With the on-board intelligence and simultaneous connection to many different geographical areas, for example, simultaneous connections to London, Paris, New York and the mid-Atlantic Ocean, the present invention can take information originating from multiple areas and received on-board the satellite almost simultaneously, and can process this information instantaneously on-board the satellite. Using the intelligence data received and the on-board software engine processing, the system can then send commands down to different receivers or terminals connected to different beams. This feature of the invention can be highly advantageous in situations when new instructions need to be transmitted to terminals in seconds or fractions of a second in response to data shared and received from many different remote locations at the same time. Because the inventive system is satellite-based, the invention allows users to remain in continuous communications from remote locations that are missing ground-based infrastructure, such as the mid-Atlantic, and the users can engage in time-sensitive financial transactions, such as securities or commodity trading.

Other objects, advantages and embodiments of the various aspects of the present invention will be apparent to those who are skilled in the field of the invention and are within the scope of the description and the accompanying figures. For example, but without limitation, structural or functional elements might be rearranged, or method steps reordered, consistent with the present invention. Similarly, a terminal may comprise a single instance or a plurality of devices, such plurality possibly encompassing multiple terminal types. The types of equipment described in various embodiments are not meant to limit the possible types of hardware elements that may be used in embodiments of aspects of the present invention, and other instrumentation that may accomplish similar tasks may be implemented as well. Similarly, principles according to the present invention, and methods and systems that embody them, could be applied to other examples, which, even if not specifically described here in detail, would nevertheless be within the scope of the present invention.

What is claimed is:

1. A method for shifting communications of a terminal located on a moving platform from a first satellite beam to a second satellite beam, the method comprising:
   a. determining a time for initiation of a beam shift from the first satellite beam to the second satellite beam;
   b. executing a first beam shift from the first satellite beam to the second satellite beam; and
   c. executing a second beam shift from the first satellite beam to the second satellite beam,
   wherein the first beam shift is an uplink beam shift and the second beam shift is a downlink beam shift, or the first beam shift is a downlink beam shift and the second beam shift is an uplink beam shift; and
   the first and second beam shifts are performed using at least one of a switch matrix or a channelizer, wherein the switch matrix or the channelizer is configured to input the switched uplink data channel from the first satellite beam to the second satellite beam into a common regenerative payload demodulator circuit in a synchronized manner concurrently with a corresponding frequency switch in the terminal uplink.

2. The method of claim 1, further comprising examining the quality of the connection to the second satellite beam, and reverting back to the first satellite beam if the quality of the connection is below a predetermined threshold.

3. The method of claim 1, wherein the first and second satellite beams are broadcast by the same satellite or by two separate satellites.

4. A system for automated shifting of a communications signal of a terminal located on a moving platform from a first satellite beam to a second satellite beam, the system comprising:
   a. an uplink switch in the satellite for receipt of the communications signal transmitted from the terminal, the uplink switch comprising:
   (i) a regenerative payload comprising at least one demodulator for extracting information received in the satellites, and an on-board processor for processing data; and
   (ii) at least one of a switch matrix or a channelizer for switching an uplink data channel from the first satellite beam to the second satellite beam upon receipt of a switch command, wherein the at least one of a switch matrix or a channelizer is configured to input the switched uplink data channel from the first satellite beam to the second satellite beam into a common regenerative payload demodulator circuit in a synchronized manner concurrently with a corresponding frequency switch in the terminal uplink;
b. a downlink switch in the satellite for transmission of communications comprising:
(i) a regenerative payload comprising at least one modulator for encoding a data signal to be sent from the satellites, and an on-board processor for processing data;
(ii) at least one of a switch matrix or a channelizer for switching a downlink data channel from the first satellite beam to the second satellite beam; and
(iii) at least two demodulators with a corresponding switch functionality in the terminal; and
c. a computer software engine on board the satellite and the moving platform and configured with computer instructions for determining optimal time for beam shift execution.

5. The system according to claim 4, wherein the downlink switch comprises two demodulators, wherein the first demodulator is locked on a downlink signal from the first satellite beam and the second demodulator is locked on a downlink signal from the second satellite beam.

6. The system according to claim 5, wherein a user application on the terminal is connected to either the first or second demodulator through a command controllable switch.

7. The system according to claim 4, wherein:
each satellite is equipped with a software engine and control function connected to respective on-board processors and at least one of the switch matrixes or the channelizers;
the terminal is equipped with a terminal software engine and control function; and
the software engines and control functions of the system are synchronized with each other and are configured to generate and transmit the switch command to execute the shifting of the communications signal.

8. The system according to claim 4, wherein the system generates the switch command on-board the satellite and the switch command is sent to the terminal for execution.

9. The system according to claim 4, wherein the system generates the switch command in the terminal and transmits the switch command to one or more satellites for execution.

10. The system according to claim 4, wherein the switch command is configured to contain specific information for synchronizing a beam shift.

11. The system according to claim 4, wherein the terminal is configured to request a beam shift based on its location and local conditions.

12. The system according to claim 4, wherein the system is configured to respond to input from sensors on the ground and from information received from a network operations center for improvement of satellite coverage.

13. The system according to claim 12, wherein:
the system is configured to increase signal capacity by at least one of switching in additional power, moving additional beams into a desired service area, or adding frequency slots in certain regions; and
the system executes automated satellite beam shifting as necessary in response to newly-added signal capacity.

14. The system according to claim 4, wherein the system is configured to gather information about issues affecting signal conditions from at least one of traffic flowing through a network comprising the system, the on-board processor and network operations center, or ground sensors and atmospheric sensors, and the system informs users in real time of such issues.

15. The system according to claim 4, wherein the system comprises computer instructions and flight control configured to maintain optimized communications signal capacity and quality during travel of the moving platform.

16. The system according to claim 4, wherein the first and second satellite beams are transmitted by the same satellite or by different satellites.

* * * * *